United States Patent [19]

Hall et al.

[11] Patent Number: 5,552,458
[45] Date of Patent: Sep. 3, 1996

[54] PASSIFICATION OF OPTICALLY VARIABLE PIGMENT AND WATERBORNE COATING COMPOSITIONS CONTAINING THE SAME

[75] Inventors: Jon R. Hall, Howell; Clint W. Carpenter, Royal Oak; Stuart K. Scott, Allen Park, all of Mich.

[73] Assignee: BASF Corporation, Southfield, Mich.

[21] Appl. No.: 439,532

[22] Filed: May 11, 1995

Related U.S. Application Data

[62] Division of Ser. No. 247,803, May 23, 1994, Pat. No. 5,498,781.

[51] Int. Cl.⁶ ............................. C08K 3/20; C08L 63/02
[52] U.S. Cl. ..................... 523/403; 523/205; 523/212
[58] Field of Search ............................. 523/205, 212, 523/403

[56] References Cited

U.S. PATENT DOCUMENTS 5,135,812  8/1992  Phillips et al. ........................ 428/403
5,372,638  12/1994  DePue et al. ........................ 428/402

OTHER PUBLICATIONS

R. J. Lewis, Sr. ed., Hawley's Condensed Chemical Dictionary, (1993), p. 866.

*Primary Examiner*—Melvyn I. Marquis
*Assistant Examiner*—D. Aylward
*Attorney, Agent, or Firm*—Anne Gerry Sabourin

[57] ABSTRACT

The present invention is a composition comprising an optically variable pigment modified with a silane functional compound and a copolymer which is a polymeric backbone having a reactive functionality thereon to react with the silane functional compound. The invention also includes a process for treating the optically variable pigment, and a coating composition containing the treated optically variable pigment.

9 Claims, No Drawings

PASSIFICATION OF OPTICALLY VARIABLE PIGMENT AND WATERBORNE COATING COMPOSITIONS CONTAINING THE SAME

This is a divisional of application(s) Ser. No. 08/247,803 filed May 23, 1994, U.S. Pat. No. 5,498,781.

FIELD OF THE INVENTION

The present invention is related to surface treated optically variable pigment. More specifically the invention is related to treatment of optically variable pigment for use in coating compositions, particularly automotive coating compositions.

BACKGROUND OF THE INVENTION

The use of optically variable pigments has been described in the art for a variety of applications, such as inks for counterfeit-proof applications such as currency, and generically for coating compositions. They are described, for example, in U.S. Pat. Nos. 4,434,010, 4,704,356, 4,779,898, 4,838,648, 4,930,866, 5,059,245, 5,135,812, 5,171,363, and 5,214,530. These pigments are prepared by depositing inorganic transparent dielectric layers, semi-transparent metal layers, and metal reflecting layers onto a flexible web, and separating the layers from the web in such a manner as to fragment the deposited thin film layer structure into pigment particles. These particles are in the form of irregularly-shaped flat pigment flakes. These pigments are capable of producing dramatic visual effects, including dichroic effects not observed in other types of pigments.

Optically-variable thin-film pigment flakes are prepared by depositing onto a flexible web combinations of transparent dielectric layers, semi-opaque metal layers, and metal reflecting layers to form a multilayer thin film interference structure. The interference structure typically has at least one metal reflecting layer, at least one transparent dielectric layer and at least one semi-transparent metal layer. Various combinations of these layers can be utilized to achieve the desired optically variable effect. In a preferred embodiment, the interference structure produces a dichroic optical effect and has in order, on one side of the metal reflecting layer, at least one transparent dielectric layer and at least one semi-transparent metal layer. In a particularly preferred embodiment, this layer structure is symmetrical on both sides of the metal reflecting layer.

Aluminum is often used as the metal reflecting layer for a variety of reasons such as its cost and commercial availability, although other materials, such as gold, copper, or silver can also be used. The semi-opaque metal layer can be formed from metals such as chromium, nickel, or Inconel. The transparent dielectric layers can be formed from materials such as silicon dioxide, magnesium fluoride, or aluminum oxide. Layer thicknesses can be varied according to the particular desired characteristics of the pigment. For example, U.S. Pat. No. 5,135,812 describes useful thicknesses being on the order of 80 nm for the metal reflecting layer, 5 nm for the semi-opaque metal layers, and thicknesses of a plurality of halfwaves of the particular design wavelength for the transparent dielectric layers.

As mentioned above, the optically-variable thin-film pigment flakes are prepared by coating the semi-transparent metal layers, transparent dielectric layers, and metal reflecting layer onto a flexible web, and separating the web from the multilayer structure to form the pigment flakes. The web is typically a polymer material, such as polyvinyl alcohol or polyethyleneterephthalate. The separation can be accomplished by stripping the multilayer structure from the web, in which case a stripping layer, as is known in the art, is preferably deposited onto the web prior to the other layers. Heat and/or solvent may be used to facilitate the stripping process. Alternatively, the web may be dissolved in a suitable solvent (aqueous or organic, depending on the solubility of the web material) to accomplish the separation. The coated web may optionally be cut or shredded to more easily fit into a container prior to the dissolution step.

As the multilayer structure is separated from the web, it typically breaks into flakes of irregular shapes and sizes. These flakes will usually require further processing to achieve the size requirements for use in a coating composition. This can be accomplished by techniques known in the art, such as ultrasonic agitation, milling, or grinding. It may be preferred to use various combinations of solvents, surfactants, and/or resins during the size reduction process, as is known in the art.

The present invention relates to compounds that are useful for surface modification and corrosion inhibition of optically variable pigment particles. In particular, the invention concerns surface modification of the pigments for use in aqueous coating compositions. The surface modified pigments are also useful in solvent borne coating compositions. The invention further relates to decorative coatings formed from aqueous compositions containing surface modified optically variable pigments.

Automotive coatings may utilize a single, uniformly pigmented layer. Alternatively, they may have two distinct layers, a lower, highly pigmented layer and an upper layer with little or no pigmentation. The two-layer coating is known in the industry as basecoat/clearcoat or color plus clear coat. Basecoat/clearcoat coatings impart a high level of gloss and depth of color that result in a particularly appealing look. Metallic flake pigments may be incorporated to give the coating a metallic effect.

Waterborne automotive paints are gaining widespread usage in the automotive industry due to concerns over organic solvent emissions during application of paints. The new waterborne paints have the disadvantage of using a medium which is corrosive to metallic flake pigments, such as the optically variable pigments. For example the pH of the waterborne acrylic coating compositions typically ranges from 8.0–9.0, and the polyurethane coating compositions have a pH typically ranging from 7.5 to 8.0. In a basic pH environment, the optically variable pigment is oxidized. The oxidation is a form of corrosion which destroys the metallic pigmentation properties of the mirror-like particles. Oxidation of the metallic surfaces by water results in the evolution of hydrogen gas. The amount of hydrogen gas evolved is indicative of the amount of oxidation (i.e. corrosion) of the metallic pigment. The hydrogen gas may accumulate in the paint. Furthermore, when a paint with oxidized optically variable pigments is coated onto a substrate, the coating shows discoloration, a significant loss of chroma, a shift in hue and diminished metallic effect.

Deterioration of optically variable pigment may accelerate over time due to continuous contact with the basic pH environment of the coating composition. Coating compositions containing the optically variable pigments are often stored for 6 months or more before application, which can result in significant corrosion of the pigment. If this corrosion remains unchecked the coating composition may be unusable.

Treatment of optically variable pigment with the compounds of the present invention reduces oxidation of the pigment in waterborne paints. The surface modification of the optically variable pigment is also effective to reduce color change of cured paint films upon exposure to humidity. This is effective for both solventborne and waterborne vehicle paints.

SUMMARY OF THE INVENTION

The present invention provides, in one aspect a class of compounds for use in surface modification of optically variable pigment particulate to reduce gassing of the pigment in waterborne coating compositions and to improve the humidity resistance of cured films formed from the coating composition. By the term "optically variable pigment" as used throughout this specification and the appended claims is meant pigments which are prepared by depositing inorganic transparent dielectric layers, semi-transparent metal layers, and metal reflecting layers onto a flexible web, and separating the layers from the web in such a manner as to fragment the deposited thin film layer structure into pigment particles. These particles are in the form of irregularly-shaped flat pigment flakes.

The pigments of the present invention are treated with a silane functional polymer of the general formula

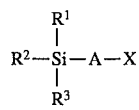

where $R^1$, $R^2$ and $R^3$ may be the same or different and are selected from alkyl of from one to ten carbon atoms, alkoxyl of from one to ten carbon atoms, alkoxyalkoxyl of from two to ten carbon atoms, alkanoyloxy of from two to ten carbon atoms, or halogen, with the proviso that $R^1$, $R^2$, and $R^3$ may not all be alkyl. The group "A" is a divalent radical selected from straight or branched alkylene of from one to twelve carbon atoms, phenylene or phenylene substituted with halogen, or alkyl or alkoxyl of from one to four carbon atoms. The group "X" is selected from —OH—, —NHR$_4$, —NCO—, —SH, phenol, epoxy, anhydride and carbonate. The group $R^4$ is hydrogen or alkyl of from 1 to 12 carbon atoms. Following treatment of the pigment with the silane containing compound, the pigment is treated with a copolymer comprising a polymeric backbone substituted with a reactive functionality. The X group is selected to react with the reactive functionality on the polymeric backbone.

As used throughout this specification and the appended claims, the term "alkyl" denotes a monovalent hydrocarbon radical derived by the hypothetical removal of a single hydrogen atom from a branched or unbranched chain saturated hydrocarbon molecule, for example, methyl, ethyl, propyl, iso-propyl, etc. The term "alkoxyl" denotes a monovalent radical derived by the hypothetical removal of the hydroxyl hydrogen from a straight or branched chain alcohol, for example methoxyl, ethoxyl, etc. The terms "cycloalkylene," denotes a carbocyclic ring, which may optionally be substituted with alkyl of from one to six carbon atoms. The terms "cyclopentylene", "cyclohexylene" and "phenylene" denote divalent radicals derived by the hypothetical removal of two hydrogen atoms each from cyclopentane, cyclohexane, or benzene respectively. The term "alkoxylalkyl" denotes a monovalent radical derived by the hypothetical removal of a hydrogen atom from an ether, for example groups such as ethoxyethyl (CH$_3$CH$_2$OCH$_2$—). The term "alkoxylalkoxyl" denotes a monovalent radical derived by the hypothetical removal of the hydroxyl hydrogen from a diol monoether, for example groups such as CH$_3$CH$_2$OCH$_2$—O—. The term "alkanoyloxy" denotes a monovalent radical derived by the hypothetical removal of the acidic hydrogen from a straight or branched carboxylic acid as, for example, groups such as acetyloxy (CH$_3$COO—). The term "alkylene" denotes a divalent radical derived by the hypothetical removal of two hydrogen atoms from a straight or branched chain saturated hydrocarbon.

The present invention further defines a method for surface modification of the optically variable pigment comprising the steps of reacting the pigment particles with a silane functional compound in a solvent, followed by separation of the pigment from the solvent and baking of the pigment. The pigment is then reacted with a functionalized copolymer. The treated pigment is then dried.

DETAILED DESCRIPTION OF THE INVENTION

In one embodiment, the present invention is an optically variable pigment surface modified with a silane functional polymer of the general formula

where $R^1$, $R^2$, and $R^3$ may be the same or different and are selected from alkyl of from one to ten carbon atoms, alkoxyl of from one to ten carbon atoms, alkoxyalkoxyl of from two to ten carbon atoms, alkanoyloxy of from two to ten carbon atoms, or halogen, with the proviso that $R^1$, $R^2$, and $R^3$ may not all be alkyl. The group "A" is a divalent radical selected from straight or branched alkylene of from one to twelve carbon atoms, phenylene or phenylene substituted with halogen, or alkyl or alkoxyl of from one to four carbon atoms. The group "X" is selected from —OH—, —NHR$_4$, —NCO—, —SH, phenol, epoxy, anhydride and carbonate. The group $R^4$ is hydrogen or alkyl of from 1 to 12 carbon atoms. The X group subsequently reacts with a copolymer which is added following treatment of the pigment surface with the silane compound. The copolymer includes a polymeric backbone substituted with a reactive functional group. The X group is chosen to react with the specific functionality on the copolymer.

The copolymer polymeric backbone may be, for example, vinyl, acrylic, urethane, polyester, alkyd or epoxy polymer or oligomer. The reactive functionality on the copolymer is selected from the group consisting of isocyanate, epoxy, anhydride, primary or secondary amine, hydroxy or carbonate. Preferred are isocyanate functional acrylic and urethane copolymers.

When the reactive functionality on the copolymer is isocyanate, the "X" functionality on the silane-containing compound is an isocyanate-reactive group. The isocyanate-reactive group is selected from hydroxyl, amino, mercapto, or epoxy functional groups.

For reaction with the anhydride functional copolymer, the "X" functionality on the silane-containing compound is selected from hydroxyl, or primary or secondary amine groups.

For reaction with the epoxy functional copolymer, the "X" functionality on the silane-containing compound is selected from amino, mercapto, hydroxyl, phenol or isocyanate functional groups.

For reaction with the carbonate functional copolymer, the "X" functionality on the silane-containing compound is a primary amine functional group.

For reaction with the hydroxy functional copolymer, the "X" functionality is an isocyanate, anhydride or epoxy functional group.

For reaction with the amine functional copolymer, the "X" functionality is an isocyanate, epoxy, carbonate or anhydride functional group.

In the case of an isocyanate functional copolymer, the polymeric backbone when synthesized includes thereon at least two isocyanate groups or latent isocyanate groups. This may be accomplished by either copolymerizing into the polymeric backbone a monomer with isocyanate or latent isocyanate functionality, or by reacting a group with isocyanate or latent isocyanate functionality onto the polymer. The isocyanate or latent isocyanate functionality reacts with the "X" group on the silane functional compound.

Illustrative examples of isocyanate or latent isocyanate functional urethane backbones are urethane polymers with terminal isocyanate or latent isocyanate functionality. The urethane polymers may be synthesized by known techniques, such as bulk polymerization or, preferably, solution polymerization, from polyisocyanates and polyfunctional compounds reactive with polyisocyanates, including, for example, polyols, polyamines, and amino alcohols; with the proviso that the sum of equivalents of isocyanate and latent isocyanate groups used exceeds the equivalents used of polyfunctional compounds reactive with polyisocyanates. The polyisocyanate may be, for example, isophorone diisocyanate, p-phenylene diisocyanate, biphenyl 4, 4' diisocyanate, meta-xylylene diisocyanate, toluene diisocyanate, 3,3'-dimethyl-4,4'-biphenylene diisocyanate, 1,4-tetramethylene diisocyanate, 1,6-hexamethylene diisocyanate, 2,2,4-trimethylhexane-1,6-diisocyanate, 1,3-bis-[2-(-(isocyanato-)propyl]benzene (also known as tetramethylxylyldiisocyanate, TMXDI) methylene bis-(phenyl isocyanate), 1,5-naphthalene diisocyanate, bis-(isocyanatoethyl fumarate), methylene bis-(4-cyclohexyl isocyanate), and biurets or isocyanurates of any of these.

The polyfunctional compounds reactive with polyisocyanates may include any of diols, triols, or alcohols of higher functionality, such as ethylene glycol, propylene glycol, 1,4-butanediol, 1,6-hexanediol, neopentyl glycol, trimethylolethane, trimethylolpropane, pentaerythritol, polyester polyols, polyether polyols, and the like; polyamines, such as ethylene diamine and diethylene triamine; or amino alcohols, such as diethanolamine and ethanolamine.

Preferably, one of either the polyisocyanate or the polyfunctional compound reactive with polyisocyanate has functionality (including latent functionality) greater than two. The reactants are apportioned so that the polyurethane copolymer has terminal isocyanate functionality and a weight average molecular weight preferably of at least 1000, and more preferably from 1000 to 20,000. The weight average molecular weight is determined by gel permeation chromatography using polystyrene standards.

Illustrative examples of isocyanate or latent isocyanate functional acrylics are copolymers of an ethylenically unsaturated monomer containing an isocyanate or latent isocyanate group. The copolymers may be prepared by using conventional techniques, such as free radical polymerization cationic polymerization, or anionic polymerization, in, for example, a batch or semi-batch process. For instance, the polymerization may be carried out by heating the ethylenically unsaturated monomers in bulk or in organic solution in the presence of a free radical source, such as an organic peroxide or azo compound and, optionally, a chain transfer agent for a batch process; or, alternatively, the monomers and initiator(s) may be fed into the heated reactor at a controlled rate in a semi-batch process.

In a particularly preferred embodiment, the ethylenically unsaturated monomer containing an isocyanate group is meta-isopropenyl-$\alpha,\alpha$-dimethylbenzyl isocyanate, available from American Cyanamid Company, Wayne, N.J. under the trade name "TMI(Meta) unsaturated aliphatic isocyanate," and is described in American Cyanamid Company's publication "TMI®(Meta) unsaturated aliphatic isocyanate", publication number 2-849 1/88. Other copolymerizable monomers can be acrylonitrile, acrylic or methacrylic acid, alkyl esters of acrylic or methacrylic acid, e.g., ethyl acrylate, butyl acrylate, 2-ethylhexyl acrylate, methyl methacrylate, butyl methacrylate, propyl methacrylate, lauryl methacrylate, 2-ethylhexyl methacrylate, and the like; and vinyl monomers, such as styrene, vinyl toluene, maleic anhydride, vinyl propionate, and the like. The choice of monomers is not critical, so long as no monomer contains a group reactive with the isocyanate group.

The polymerization reaction may be, for example, a free radical polymerization carried out in solution using such solvents as toluene, xylene, ethyl acetate, acetone, methyl isobutyl ketone, methyl ethyl ketone, methyl propyl ketone, methyl amyl ketone, methyl isoamyl ketone, mineral spirits, ethylene or propylene glycol ether acetates, and other compatible solvents. Preferred solvents are ketones. Typical free radical sources are organic peroxides such as dialkyl peroxides, peroxyesters, peroxydicarbonates, diacyl peroxides, hydroperoxides, and peroxyketals; and azo compounds such as 2,2'-azobis(2-methylbutanenitrile) and 1,1'-azobis(cyclohexanecarbonitrile). Typical chain transfer agents are mercaptans such as octyl mercaptan, n-or tert-dodecyl mercaptan, thiosalicylic acid, mercaptoacetic acid, and mercaptoethanol; halogenated compounds, and dimeric alpha-methyl styrene.

The free radical polymerization is usually carried out at temperatures from about 20° C. to about 200° C., preferably from 120° C. to 160° C. Generally, the amount of meta-isopropenyl-$\alpha,\alpha$-dimethylbenzyl isocyanate that may be incorporated into the addition polymer increases with increasing reaction temperature. The reaction may conveniently be done at the temperature at which the solvent or solvent mixture refluxes, although reflux is not necessary to the reaction. The initiator should be chosen to match the temperature at which the reaction is carried out, so that the half-life of the initiator at the reaction temperature should preferably be no more than thirty minutes.

The solvent or solvent mixture is generally heated to the reaction temperature and the monomers and initiator(s) are added at a controlled rate over a period of time, usually between 2 and 6 hours. A chain transfer agent or additional solvent may be added concurrently with the monomers and initiator(s). The mixture is usually held at the reaction temperature after the additions for a period of time to complete the reaction. Optionally, additional initiator may be added during the latter stages of the addition or after the addition is completed to ensure complete conversion. The acrylic copolymer preferably has a weight average molecular weight of at least 1000, and more preferably from 2000 to 50,000. The weight average molecular weight is determined by gel permeation chromatography using polystyrene standards.

The polymeric backbone may also be reacted with a polyalkylene glycol compound that is a polyalkylene glycol homopolymer, copolymer, or mixture thereof, to impart water soluble character to the polymer. Useful compounds for this purpose are polyalkylene glycol monoalkyl ethers and mixtures thereof. Examples of these include polyalkylene glycol monoalkyl ethers formed from monoalcohol initiated polymerization of ethylene oxide, propylene oxide and mixtures thereof with up to 30% by weight propylene oxide. Starting monoalcohols are $C_1$–$C_{18}$ alcohols such as methanol, ethanol, n-propanol, iso-propanol, hexanol, decanol, undecanol and ether alcohols such as methoxyethanol, butoxyethanol and the like. The preferred monoalkyl ethers are polyethylene glycol monoalkyl ethers, and polyethylene glycol ethers in mixture with other polyalkylene glycol monoalkyl ethers.

The polyalkylene glycol compound reacts with the reactive functionality on the polymeric backbone to form a side chain. Alternatively, the polyalkylene glycol compound can be reacted with monomer before the polymerization reaction that forms the polymeric backbone.

In another embodiment of the present invention, there is provided a method for producing the surface modified optically variable pigment which comprises the product derived from treatment of optically variable pigment with the compounds described above. The preferred process for preparing the surface modified optically variable pigment particulate includes the steps of combining pigment with a silane containing compound as described above, in the presence of solvent such as water or a wet (i.e. water-containing) alcohol such as methanol, ethanol, propanol, and the like. Water-containing alcohols are the preferred solvents for this process because of the ease with which the pigment particulate disperses without undesired caking or agglomeration in such solvent systems. The amount of water present in the wet alcohol solvents ranges between a minimum amount effective to bring about such hydrolysis, typically about five percent, to an upper limit of essentially alcohol-free water.

The pH of the mixture is adjusted to about pH 4.5 to about pH 5.5 by the addition of an organic acid such as acetic acid. The function of the water and acid is to hydrolyze the groups attached to the silicon atom in the surface modification compound. Under these conditions, the hydroxyl blocking group(s) hydrolyze only slowly, so the principal reaction is that of hydrolyzing the substituents on the silicon atom. Following addition of the optically variable pigment particulate material to the aqueous alcoholic solution of the silane functional compound, the mixture is slurried for thirty minutes and then filtered. The filtered material is dried and cured by heating at about 100° C. to about 150° C., preferably at about 110° C. to about 120° C. for a period of from about one hour to about twelve hours. The heating or curing step is believed to be necessary to effect bonding between the silane compound and the pigment material.

Following the curing step, the surface modified pigment particulate material is combined with a copolymer comprising a polymeric backbone and a reactive functionality as described above. The copolymer and pigment are mixed for about thirty minutes. The reactive functionality on the polymeric backbone reacts with the "X" functionality on the silane containing compound. In the case of an isocyanate functional polymeric backbone, excess alcohol may be added to react with any remaining unreacted isocyanate functionality. The pigment is then dried. The treated pigment is then ready for incorporation into a coating formulation, or may be stored for later use.

While not adhering to any particular theory to the exclusion of others, it is believed that the water contained in the alcoholic solvent converts the reactive groups attached to the silicon atom of the surface modification compound to hydroxyl groups. For this reason, the three groups $R^1$, $R^2$, and $R^3$, attached to the silicon atom in the surface modifying compound may not all be alkyl, which are resistant to hydrolysis under these conditions. While one or two of the substituent groups may be alkyl, it is necessary that at least one of the substituent groups attached to the silicon atom be alkoxyl, alkoxylalkoxyl, alkanoyloxy, or halogen.

The hydroxyl groups which result from hydrolysis of the substituent groups on the silicon atom then react with hydroxyl groups on the surface of the pigment particulate material to form —Si—O—M— bonds where M represents the surface metal on the pigment particulate material such as aluminum, gold, copper or silver. It is believed that the surface modification which results from the treatment of the optically variable pigment particulate material with the compounds of the present invention involves the direct covalent bonding of the surface modification-compound to the pigment particles, through the —Si—O—M— bonds which form.

The improved humidity resistance of the treated optically variable pigment indicates that the pigment treatment hinders the absorption of water by the dielectric layer, thereby reducing the swelling of the dielectric layer.

However, the exact nature of the interaction of the surface modification compounds and the pigment particulate material is not known exactly at the time 0f filing of this application. Therefore, throughout this specification and the appended claims, the terms "surface modification" and "surface modified" will be used to denote the interaction and resulting composition when pigment particles are treated with the compounds of the present invention, by the method just described.

When used in a coating composition the pigment particle size on average is from 5 to 40 μm. No more than 10% of the particles have a particle size of greater than 50 μm and substantially none of the particles has a particle size larger than 125 μm.

According to the invention, the optically-variable thin-film pigment is used in a coating composition along with a binder resin. Useful pigment:binder ratios range from 0.03:1 to 0.40:1, and preferably 0.05:1 to 0.30:1. The binder used in the present invention may be selected from any of a number of polymers known in the art. Polymers known in the art to be useful in coating compositions include acrylics, vinyls, polyurethanes, polycarbonates, polyesters, alkyds, epoxy resins, and polysiloxanes. Preferred polymers include acrylics and polyurethanes. The resin may be of the thermoplastic type, but are preferably crosslinkable, and thus comprise one or more type of cross-linkable functional groups. Such groups include, for example, hydroxy, isocyanate, amine, epoxy, acrylate, vinyl, silane, and acetoacetate groups. These groups may be masked or blocked in such a way so that they are unblocked and available for the cross-linking reaction under the desired curing conditions, generally elevated temperatures (i.e., thermoset). Useful cross-linkable functional groups include hydroxy, epoxy, acid, anhydride, silane, and acetoacetate groups. Preferred cross-linkable functional groups include hydroxy functional groups and amino functional groups.

The above-described polymers may be self-cross-linkable, or the coating composition may include a separate cross-linking agent that is reactive with the functional groups of the polymer. When the polymer comprises hydroxy functional groups, for example, the cross-linking agent may be an aminoplast resin, isocyanate and blocked isocyanates (including isocyanurates), and acid or anhydride functional cross-linking agents.

The coating composition of the present invention may be solvent-borne or water-borne. Suitable binder resins for water-borne coating compositions are water-dispersible or water-soluble ionic or nonionic resins. Anionic or nonionic resins are preferred for use in topcoat applications. Examples of water-dispersible polymers used for topcoats are contained in U.S. Pat. Nos. 4,794,147; 4,791,168; and 4,518,724, all of which are incorporated herein by reference. Such systems may also include a crosslinker, as described above. Polymeric-type melamine crosslinkers are often preferred for water-borne coating compositions where the binder resin is anionically stabilized, as such polymeric-type melamines do not require strong acid catalysis. When the film-forming resin is nonionically stabilized, a polymeric melamine may be used or a monomeric melamine may be used in conjunction with a strong acid catalyst like a sulfonic acid or blocked sulfonic acid.

A solvent may optionally be utilized in the coating composition of the present invention. Although the composition of the present invention may be utilized, for example, in the form of substantially solid powder, or a dispersion, it is usually preferred that the composition is in a substantially liquid state, which can be accomplished with the use of a solvent. This solvent should act as a solvent with respect to both the binder resin as well as any crosslinking agents used. In general, as is well-known in the art, depending on the solubility characteristics of the components in the coating composition, the solvent can be any of a number of organic solvents and/or water. In one preferred embodiment, the solvent is a polar organic solvent. More preferably, the solvent is a polar aliphatic solvent or polar aromatic solvent, such as a ketone, ester, acetate, aprotic amide, aprotic sulfoxide, or aprotic amine. Examples of useful solvents include methyl ethyl ketone, methyl isobutyl ketone, n-amyl acetate, ethylene glycol butyl ether-acetate, propylene glycol monomethyl ether acetate, xylene, n-methylpyrrolidone, or blends of aromatic hydrocarbons.

In another preferred embodiment, the solvent is water or a mixture of water with small amounts of aqueous co-solvents. Preferred co-solvents include acetates such as butyl acetate, hexyl acetate, and octyl acetate; glycol ethers and glycol ether acetates, such as propylene glycol ether and propylene glycol monomethyl ether acetate; and ketones, such as methyl propyl ketone, methyl isobutyl ketone, and methyl hexyl ketone. Glycol ethers and glycol ether acetates are especially preferred.

For most liquid coating compositions, the solvent may be present in an amount of from about 0.01 weight percent to about 99 weight percent, preferably from about 10 weight percent to about 60 weight percent, and more preferably from about 30 weight percent to about 50 weight percent.

It may be desirable to include small amounts of rheology control agents, for example fumed silicas, hectorite clays, bentonite clays, or cellulosics like cellulose acetate butyrate. Such materials are usually used at levels of less than 10% based on the total solid weight of reactants. Rheology control agents are used to control the flow and levelling of the composition during application and curing steps. The rheology control agent is also useful for controlling the metallic appearance of the coating. Such materials may help "fix" the pigment flake surface in an alignment parallel to the surface of the coating to maximize the brightness when viewed head-on and to maximize the darkness when viewed obliquely.

The coating composition of the invention may further comprise additional pigment(s), such as a metallic flake pigment or mica. The coating composition may also contain a transparent pigment to operate in a subtractive mode to modify the colors or block unwanted colors of the optically-variable thin-film pigment. Combinations of any of the above-described supplementary pigments with each other or with other known pigments may also be made.

The coating compositions according to the invention can contain optional ingredients such as wetting agents, surfactants, defoamers, antioxidants, UV absorbers, light stabilizers, plasticizers, and so forth. Examples of surfactants and wetting agents include alkyl imidazolines such as those available from Ciba-Geigy Industrial Chemicals as Amine C®, acetylenic alcohols available from Air Products and Chemicals as Surfynol® 104. These optional ingredients, when present, constitute from about 0 to 20 percent by weight of resin solids.

The coating compositions prepared according to the invention containing optically variable pigment are evaluated for hydrogen gassing by the following method. A sample of the liquid coating composition containing the optically variable pigment is placed in a gassing apparatus. The gassing apparatus is a 250 ml gas washing bottle attached to a bubble counter with two chambers. The lower chamber is filled with water, through the side neck of the bubble counter. Hydrogen gas, formed by release of the $H^+$ ions from the reaction of the metal surface of the optically variable pigment and water, presses water from the lower chamber into the upper chamber of the bubble counter. The volume of water displaced from the lower chamber equals the volume of hydrogen gas generated.

The solution is thermally equilibrated to 60° C. Next the coating composition containing the optically variable pigment is added and equilibrated to 60° C. Gas evolution is then measured over a period of days.

As shown in the tables following the Detailed Description, the treated pigments showed lower gassing than the untreated pigments.

The prepared coating composition is applied to a substrate by any of a number of conventional means, for example by spraying, brushing, dipping or flowing. The preferred methods of application are by spraying or electrostatic spraying. These methods are widely-used, especially in the application of automotive coatings. For example, the coating may be applied using a Model 62 syphon spray gun (available from Binks Manufacturing Corp., Franklin Park, Ill.) with 50–80 psi atomizing air pressure.

The substrate to which the coating composition of this invention is to be applied may be, for example, metal, ceramic, plastic, glass, paper, or wood. The substrate may also be any of the aforementioned materials precoated with this or another coating composition. The coating compositions of this invention have been found to be particularly useful over precoated steel or plastic substrates in automotive applications. They are particularly suited to use over primed automotive substrates as topcoat formulations or basecoat formulations that are overcoated with clearcoat formulations.

After application of the coating composition to the substrate, the coating is cured, preferably by heating at a temperature and for a length of time sufficient to cause the conversion of all or nearly all of the reactive groups. The cure temperature is usually from 115° C. to 180° C., and the length of cure is usually 15 minutes to 60 minutes. Preferably, the coating is cured at 120°–150° C. for 20 to 30 minutes. The thickness of the cured coating can be from 1 to 150 microns, but when used as an automotive basecoat, the coating thickness is generally from 10 to 30 microns.

In a particularly preferred embodiment, the composition of the invention is used as the pigmented basecoat of a composite color-plus-clear coating. Such composite coatings are popular for their depth of color and liquid glossy surface appearance. They have found particularly wide acceptance in the field of automotive coatings. The basecoat may be cured before the clearcoat is applied or the basecoat may be given a wet-on-wet application of a clearcoat. By the term "wet-on-wet" it is meant that after application the basecoat is allowed to flash, or dry, to remove most of the water and other solvent that it contained, but it is not cured before the clearcoat composition is applied. After the clearcoat composition is applied, it is allowed to flash or dry for a period of time, then the basecoat and the clearcoat are cured together.

The clearcoat may be a coating composition according to this invention or another composition known to the art to have utility as a clearcoat. The clearcoat does not necessarily need to use the cure mechanism used by the basecoat, although the cure mechanisms used must not interfere with one another.

The basecoat may be applied in one or two layers, with a short period between application of layers to allow solvent and water to evaporate (termed a "flash" period). After application, the basecoat may be further dried, preferably at a slightly elevated temperature, as in a 120° F. oven, for a period of 5 to 20 minutes before the clear coat composition is applied. The clearcoat composition is preferably applied by spraying, in one layer, or preferably two layers with a short flash between layers. The clearcoat composition is allowed to flash under ambient or heated conditions for 1–20 minutes. The uncured coatings are then cured, usually by thermoset methods as described hereinabove. The resulting appearance and physical properties are excellent.

The above described invention is further illustrated by the following examples.

EXAMPLES

Example 1

Isocyanate Copolymer for Pigment Treatment

A reactor was charged with 211.5 g methyl isoamyl ketone and heated to 145° C. A temperature of between 145° and 150° C. was maintained and 177.8 g butyl methacrylate, 160.2 g butyl acrylate, 104.2 g styrene, 302.0 g meta-isopropenyl-α,α-dimethylbenzyl isocyanate, and 74.4 g t-butyl peracetate were added gradually over a period of 2 hours and 55 minutes.

Next 37.2 grams of t-butyl peracetate and 52.3 g methyl isoamyl ketone were added to the reaction vessel over a period of 30 minutes and the temperature was maintained at between 142° and 150° C.

Example 1A

Modified Isocyanate Copolymer for Pigment Treatment 102.8 g of the isocyanate copolymer prepared in Example 1 was combined with a polymer prepared from 325.5 g of methoxy polyethylene glycol, 650.1 g ε-caprolactone, 2 ml phosphoric acid and 0.05 g dibutyl tin dilaurate.

Example 2

Treatment of Pigment with Amino-Silane Functional Polymer and Isocyanate Functional Copolymer from Ex. 1A

| Ingredient | Amount |
|---|---|
| 1. Isopropanol | 1000.0 g |
| 2. Deionized Water | 10.0 g |
| 3. $(CH_3CH_2O)_3Si(CH_2)_3NH_2$ | 0.5 g |
| 4. Pigment[a] | 20.1 g |
| 5. Acetic Acid | 0.1 g |
| 6. Isocyanate Functional Polymer from Ex. 1A | 1.8 g |

[a] cyan to purple optically variable pigment.

Ingredients 1–5, in the amounts specified, were mixed for 15 minutes, then allowed to settle. Liquid was removed by decanting through a filter. The treated pigment was washed and air dried for 1 hour.

20.1 grams of the treated pigment was then combined with 800.0 g methyl ethyl ketone, with mixing for 30 minutes. A mixture of 1.8 grams of the isocyanate functional polymer from Ex. 1A was combined with 50.0 grams methyl ethyl ketone and added to the pigment mixture and the mixture was stirred for 15 minutes. This was followed by the addition of 1.0 g dibutyl amine. The mixture was then stirred for 15 minutes. The treated pigment was then filtered and washed.

Example 3

Treatment of Pigment with Amino-Silane Functional Polymer and Isocyanate Functional Polymer from Ex. 1

| Ingredient | Amount |
|---|---|
| 1. Isopropanol | 399.9 g |
| 2. Deionized Water | 19.9 g |
| 3. $(CH_3CH_2O)_3Si(CH_2)_3NH_2$ | 2.1 g |
| 4. Pigment[a] | 13.3 g |
| 5. Acetic Acid | 0.2 g |
| 6. Isocyanate Functional Polymer from Ex. 1 | 2.4 g |
| 7. Isopropanol | 100.4 g |
| 8. Methanol | 3.0 g |

[a] cyan to pruple optically variable pigment.

A mixture of ingredients 1–5 was slurried for 30 minutes, followed by three cycles of rinsing and filtration. The treated pigment was then baked at 110° C. for 2 hours. Ingredients 6 and 7 were then added to the treated pigment and the mixture was stirred 30 minutes. Methanol was then added. The solvent was evaporated over a period of three (3) days.

Examples 4–5A

| Waterborne Coating Compositions | |
|---|---|
| Ingredient | Amount (Wt. %) |
| Rheology Control Agent | 27.61 |
| Melamine-Formaldehyde Resin Cymel ® 327 | 3.97 |
| Butyl Cellosolve | 0.79 |
| Anionic Polyurethane Resin | 45.36 |
| Pigment Dispersion | 5.74 |
| Surfactant Flow Additive | 0.87 |
| Tinuvin ® 113OUV Absorber | 0.33 |
| Branched Polyester Slurry Resin | 5.94 |
| Propyl propasol | 2.68 |
| Optically Variable Pigment* | 1.39 |
| Dimethylethanolamine (5% solution) | 2.56 |
| Deionized water | 2.76 |
| Total | 100.00 |

*indicates pigment as described in Ex. 4–5A.

Example 4

Coating composition prepared as above with pigment from Example 2.

Example 4a

Coating composition prepared as above with untreated optically variable pigment.

Example 5

Coating composition prepared as above with treated pigment from Example 3.

Example 5A

Coating composition prepared as above with untreated pigment.

TABLE 1

Gassing Results for Coatings Containing Treated and Untreated Pigment

| COATING | GASSING TEST RESULTS OVER TIME | | | |
| --- | --- | --- | --- | --- |
|  | DAY 1 | DAY 6 | DAY 7 | DAY 14 |
| 4 | 21 | 58 | — | — |
| 4A | 28 | 62 | — | — |
| 5 | 8 | — | 16 | 22 |
| 5A | 24 | — | 61 | 66 |

TABLE 2

Humidity Test Results for Color Change for Coatings Containing Treated and Untreated Pigment

| SAMPLE | Δ L* | Δ C* | Δ H* | Δ E* |
| --- | --- | --- | --- | --- |
| 5 | −0.02 | 0.34 | −0.93 | 0.99 |
| 5A | 0.13 | 0.09 | −1.56 | 1.57 |

Panels were prepared for the humidity test by spray application of the waterborne coating composition from Ex. 5 and 5A onto primed metal panels, followed by flash drying for 10 minutes at 60° C. The coatings were then baked for 20 minutes at 129° C. to cure to a hard durable coating having a basecoat thickness of 15–20 μm.

Color change was measured on the panels by a 16 hour, 140° F. QCT Humidity Test. The measurements on the table indicate the difference in color on a single coated panel between a section of the panel exposed to humidity and an unexposed section of the panel. The color differences were measured on a Pacific Scientific Spectroguard II spectrophotomer, d/8 geometry, specular included, large area view, illiminart D65, 10° Observer, using 1976 CIEL* a* b* color difference functions. 1976 CIEL* a* b* indicates the color space used. ΔL* indicates change in lightness. ΔC* indicates change in chroma. ΔH* indicates change in hue. ΔE* indicates total color difference.

We claim:

1. A waterborne coating composition comprising
   a) optically variable pigment modified with
   i) a silane functional compound having the formula $$R^2-\underset{\underset{R^3}{|}}{\overset{\overset{R^1}{|}}{Si}}-A-X, \quad (I)$$

where $R^1$ $R^2$ and $R^3$ may be the same or different and are selected from alkyl of from one to ten carbon atoms, alkoxyl of from one to ten carbon atoms, alkoxyalkoxyl of from two to ten carbon atoms, alkanoyloxy of from two to ten carbon atoms, or halogen, with the proviso that $R^1$, $R^2$, and $R^3$ may not all be alkyl, the group "A" is a divalent radical selected from straight or branched alkylene of from one to twelve carbon atoms, phenylene or phenylene substituted with halogen, or alkyl or alkoxyl of from one to four carbon atoms, the group "X" is selected from the group consisting of —OH—, —SH, —$NHR_4$, —NCO—, epoxy, carbonate, anhydride, phenol, and mixtures thereof, wherein $R^4$ is hydrogen or alkyl of from 1 to 12 carbon atoms and
   ii) a copolymer which is a polymeric backbone having a reactive functionality thereon selected from the group consisting of isocyanate, epoxy, anhydride, primary or secondary amine, hydroxy or carbonate functionalities and mixtures thereof and
   b) a polymer resin binder.

2. The coating composition of claim 1, wherein the copolymer is a polymeric backbone selected from the group consisting of vinyl, acrylic, urethane, polyester, alkyd or epoxy polymer or oligomer, and the reactive functionality on the copolymer is selected from the group consisting of isocyanate, epoxy, anhydride or carbonate functionalities.

3. The coating composition of claim 1, wherein the pigment to binder ratio is from 0.03:1 to 0.40:1.

4. The coating composition of claim 1, wherein the optically variable Pigment Particles have an average Particle size of 5 to 40 μm.

5. The coating composition of claim 1, wherein polymeric backbone is an acrylic polymer having a molecular weight of from 2,000 to 50,000.

6. The coating composition of claim 1, wherein the X functional on the silane compound is selected from the group consisting of epoxy, hydroxy, primary amines and secondary amines.

7. The coating composition of claim 1, wherein the functional group on the acrylic polymer is isocyanate.

8. The coating composition of claim 1, wherein the composition is a basecoat.

9. A waterborne coating composition comprising
   a) optically variable pigment modified with
   i) a silane functional compound having the formula $$R^2-\underset{\underset{R^3}{|}}{\overset{\overset{R^1}{|}}{Si}}-A-X, \quad (I)$$

where $R^1$, $R^2$, and $R^3$ may be the same or different and are selected from alkyl of from one to ten carbon atoms, alkoxyl of from one to ten carbon atoms, alkoxyalkoxyl of from two to ten carbon atoms, alkanoyloxy of from two to ten carbon atoms, or halogen, with the proviso that $R^1$, $R^2$, and $R^3$ may not all be alkyl, the group "A" is a divalent radical selected from straight or branched alkylene of from one to twelve carbon atoms, phenylene or phenylene substituted with halogen, or alkyl or alkoxyl of from one to four carbon atoms, the group "X" is selected from the group consisting of —OH—, —SH, —NHR$_4$, —NCO—, epoxy, carbonate, anhydride, phenol, and mixtures thereof, wherein R$^4$ is hydrogen or alkyl of from 1 to 12 carbon atoms and ii) a copolymer which is a polymeric backbone having a reactive functionality thereon selected from the group consisting of isocyanate, epoxy, anhydride, primary or secondary amine, hydroxy or carbonate functionalities and mixtures thereof and b) a polymer resin binder, wherein the treated optically variable pigment demonstrates resistance to color change upon exposure to humidity.

* * * * *